Sept. 21, 1948.   M. E. BYRNE   2,449,549
SWEEP CIRCUIT FOR CATHODE RAY TUBES
Filed Sept. 14, 1943
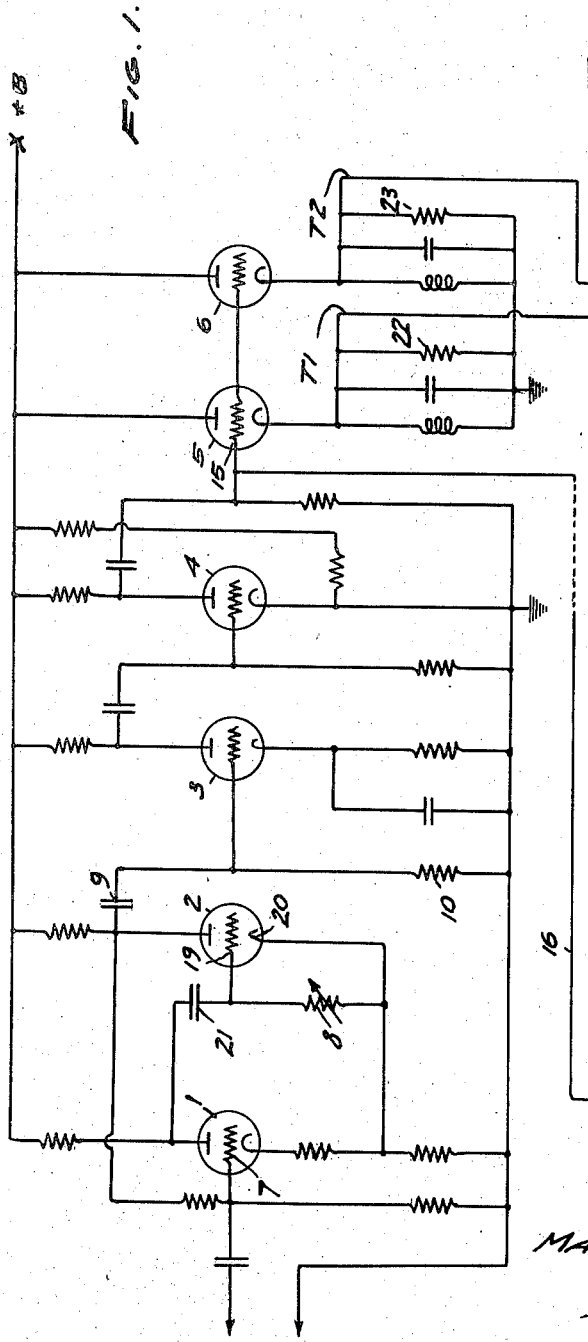
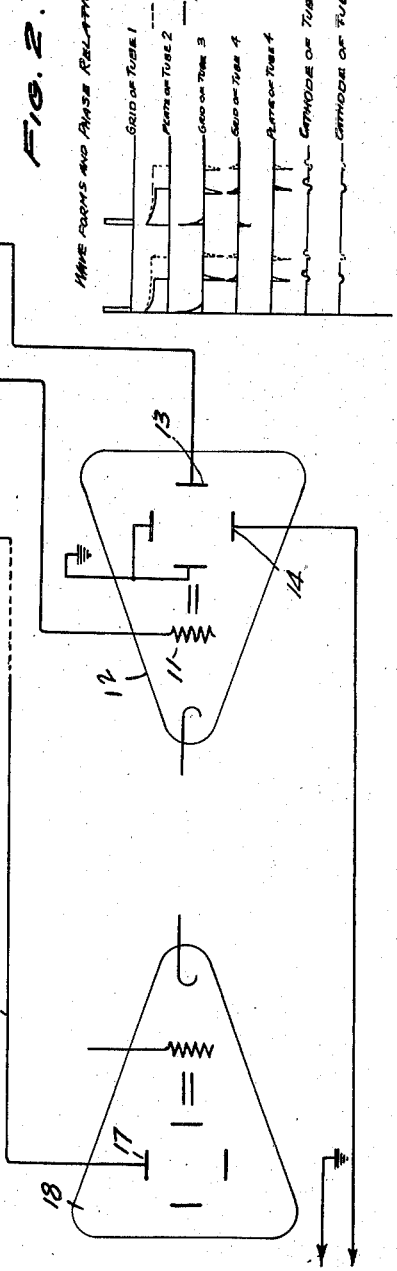
INVENTOR
MAURICE E. BYRNE
By William D. Hall.
ATTORNEY.

Patented Sept. 21, 1948

2,449,549

UNITED STATES PATENT OFFICE 2,449,549

SWEEP CIRCUIT FOR CATHODE-RAY TUBES

Maurice E. Byrne, United States Army, Lewiston, Idaho

Application September 14, 1943, Serial No. 502,271

5 Claims. (Cl. 315—9)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio circuits, particularly to sweep circuits of a cathode ray tube.

One object of this invention is to provide a circuit for magnifying one portion of the sweep circuit of an oscilloscope.

Another object is to provide a circuit which will permit the choice of a portion of a cathode ray tube sweep that magnifies on an auxiliary oscilloscope.

Still another object is to provide a circuit in which the portion of the sweep chosen for magnification is adjustably selected.

Other objects of my invention will be apparent from the annexed description, at the end whereof the novel features of my invention will be specifically pointed out and claimed.

In the drawings:

Figure 1 is a circuit diagram.

Figure 2 illustrates the wave shapes as they appear at various indicated portions of the circuit.

In that embodiment of my invention which has been selected for illustration there are shown six triodes or three-element electric tubes marked 1 to 6, respectively. Tubes 1 and 2 and connecting components constitute a multi-vibrator type generator of rectangular voltage pulses. This circuit is activated upon the application of a pulse from outside source to the grid of tube 1. Resistor 8, forming the grid resistor of tube 2, is adjustable and its adjustments will be explained later in a description of the operation of the entire circuit.

In the plate circuit of tube 2 forming the output of the square wave generator, and coupling network to the next stage, is capacitor 9 and resistor 10. The value of these components is such as to create a short time constant so as to produce short pulses at each change of direction of the square wave output from tube 2.

Tube 3 is a linear amplifier. Tube 4 in the following stage is biased highly negative. The positive-going portion of pulse output from tube 3 will raise the grid of tube 4 above cutoff. The output at this point is a single recurrent short pulse or "pip" which is applied to the grids of tubes 5 and 6, connected in parallel.

In the cathode circuits of tubes 5 and 6 are a pair of similar damped tube circuits, T—1 and T—2. Circuit T—1 is tuned to a frequency double that frequency to which circuit T—2 is tuned. The output of tuned circuit T—1 is connected to the grid 11 of a cathode ray tube 12, while the output of tuned circuit T—2 is connected to the horizontal deflecting plates 13. The wave form meant to be studied is applied to the vertical plate 14 in the usual manner.

Since tube 12 is suggested as an additional or monitor tube, a portion of the pulse applied to the grid 15 of tube 5 is fed by lead 16 to the vertical plate 17 of the main cathode ray tube 18 so that an indication of the portion of sweep being investigated will be given.

For the purpose of illustration, the following operation is described as used with a radio object locating system, in which a succession of short pulses are transmitted, the reflection appearing on a cathode ray oscilloscope:

At steady state the grid 19 of tube 2 is at the same potential as its cathode 20 so that tube 2 is normally conducting while tube 1 is biased to cutoff. Since tube 1 is at cutoff, capacitor 21 is fully charged. A portion of the succession of keying pulses is applied to the grid 7 of tube 1. A positive pulse applied to grid 7 raises tube 1 above cutoff and plate current starts flowing. The resultant negative pulse applied to grid 19 causes less plate current to flow in tube 2 and grid 7 goes more positive, further increasing the plate current in tube 1. This cycle which is instantaneous continues until tube 1 is drawing maximum current and tube 2 is far below cutoff.

The charge on capacitor 21 starts to leak off through resistor 8 and the now conducting tube 1. The charge will leak off until the potential on grid 19 raises tube 2 above cutoff and plate current starts flowing. The cycle is then reversed and also occurring instantaneously drives tube 1 back to cutoff and tube 2 to maximum current. After the second cycle, the tubes are at normal and nothing can occur until another positive pulse is received on the grid of tube 1.

The time taken for the charge on capacitor 21 to leak off to a potential where tube 2 will start conducting is regulated by varying resistor 8.

As seen in Figure 2 the output of tube 2 is a wave which has a fixed front occurring in synchronism with the applied positive pulse to grid 7 while the rear of the wave is adjustably variable in time. This adjustment is the simple manual operation accomplished by varying resistor 8.

The differential coupling network of capacitor 9 and resistor 10 connected to the plate circuit of tube 2 produces a short pulse at each change of direction of the square wave output of tube 2. The short pulse produced at the beginning of the square wave output is positive in nature while that produced at the end of the square wave is negative as indicated in Fig. 2. Consequently, the negative going part of the voltage applied to the grid of tube 3 may be moved along the axis in time. This negative pulse at grid of tube 3 will appear as a positive pulse on the grid of tube 4, raising tube 4 above cutoff. Consequently, the output of tube 4 is a single recurrent pulse or "pip," negative in character as illustrated in Fig. 2, and selectively variable in time with respect to the keying pulse.

This wave having a steep front is fed to tubes 5 and 6 containing the damped tuned circuits T—1 and T—2. Each of tubes 5 and 6 is normally conducting. The current flow in each tube is suddenly cut off as a result of the negative pulse from tube 4 applied to the grid, and the field in each inductance suddenly collapses. Thus the steep wave front shocks the tuned circuits into oscillation by the inductance capacitor exchange.

The value of resistor 22 is such as to damp out the oscillation of tuned circuit T—1 after one cycle, while the resistor 23 has a value which will damp out the oscillation in tuned circuit T—2 after one half cycle.

The output of tuned circuit T—1 is applied to the grid 11 of cathode ray tube 12, so as to cause brilliance on the positive half cycle and blackout on the negative half cycle. The output of tuned circuit T—2 applied to the horizontal deflecting plate 13 of cathode ray tube 12 is the sweep frequency. Since the last half of the sweep cycle is blacked out by the grid, only one quarter of the total alternation is visible and the return is eliminated.

A frequency may be selected for instance, which will make visible a distance of one mile of range of the radio object locating system. Control resistor 8 is varied selecting in time that portion of the main sweep desired to be expanded for study. The portion of pulse taken from grid of tube 5, fed to the vertical plates of the main cathode ray tube 18 gives an indication of that portion of the main sweep selected for magnification. In the radio object locating system this will be the time when the reflected pulse or "pip" occurs.

The keying pulses applied to grid 7 of tube 1 occur synchronously with the sweep frequency cycles of the main cathode ray tube 18 in a manner well known to those skilled in the art.

Thus we may select any portion of the main sweep desired, apply it to the additional oscilloscope 12, and through magnification of that portion, carefully study the detailed wave shape.

I claim:

1. In an oscilloscope circuit, a generator of square wave electrical impulses, means for variably controlling the duration of said square wave impulses, a circuit means for generating short electrical impulses at the beginning and end of each of said square wave impulses, a first tuned circuit and a second tuned circuit tuned to a frequency different from said first tuned circuit, means for applying at least one of said short pulses to said first and second tuned circuits whereby said tuned circuits are shocked into oscillation, and a cathode ray tube, of which the grid is connected to said first tuned circuit and one set of deflecting plates is connected to said second tuned circuit.

2. The method of expanding a portion of the indication on a cathode ray tube which includes applying a desired signal to a deflecting plate of a first cathode ray tube, generating a pulse of electrical energy synchronously with the sweep frequency of said first cathode ray tube, adjusting the duration of said pulse, passing said pulse through a differentiating circuit thereby generating a short pulse at the beginning and end of said main pulse, applying at least one of said short pulses to a first tuned circuit and a second tuned circuit tuned to a frequency different from said first tuned circuit thereby shocking said first and second tuned circuits into oscillation, applying the output of said first tuned circuit to a second cathode ray tube as brilliance control and the output of said second tuned circuit as sweep frequency and applying a portion of said desired signal to said second cathode ray tube for study.

3. Means for providing a magnified indication of a portion of the sweep of an object-detecting system comprising, a first cathode ray tube, a second cathode ray tube, a circuit including a single-shot multivibrator to which a succession of keying pulses are fed and which is adapted to provide a square wave, a manually-adjustable control element connected into circuit with said multivibrator and controlling the width of said square wave so that the front rise on said square wave occurs in time in synchronism with the applied keying pulse and the rear drop of said square wave is selectively variable in time for a continuous interval from zero until the next wave starts, a coupling network which produces short pulses of peak waves at each change of direction of the square wave output, a linear amplifier connected to receive the output of said coupling network, a triode with grid biased highly negative connected to the output of said amplifier, the output of which is a series of pulses comprising only one side of the output wave from said amplifier, a connection between the plate circuit of said triode and the vertical deflecting plates of said main cathode ray tube whereby there is provided in said first cathode ray tube a visual indication of the position along the sweep which the second cathode ray tube is working on, a first damped tuning circuit connected to the output of said triode, a connection between the first damped tuned circuit and the grid of said second cathode ray tube to cause brilliance on the positive half cycle and blackout on the negative half cycle, a second tuned circuit connected to the output of said triode and critically damped to pass only one half cycle of each pulse and a connection between said second tuned circuit and said second cathode ray tube, whereby the sweep of said second cathode ray tube represents one magnified portion of the sweep of said first cathode ray tube.

4. In a radio-operated object-locating device having a main cathode ray tube, an auxiliary cathode ray tube arranged to give a magnified indication over a portion of the area covered by said main cathode ray tube, a first damped tuning circuit connected to the grid of said auxiliary cathode ray tube, a second damped tuning circuit having half the frequency of said first damped tuning circuit and connected to the sweep deflecting plates of said auxiliary cathode ray tube, a square wave generator arranged to produce oscillations in response to keying impulses, a selectively variable control element connected to said generator so as to vary the time between the reversals in polarity of the wave put out by said generator, connections between said generator and said damped circuits, and circuit means between said auxiliary cathode-ray tube and said main cathode-ray tube whereby said auxiliary cathode-ray tube is responsive to said portion of area of said main cathode-ray tube.

5. Means for providing a magnified indication of a portion of the sweep of an object detecting system, comprising a first cathode ray tube, a second cathode ray tube, circuit means to which a succession of keying impulses are fed and which is adapted to provide a square wave, means for controlling the width of said square wave so that the front rise on said square wave occurs in synchronism with the applied keying pulse and the rear drop of said square wave is selectively variable in time for a continuous interval from zero until the next wave starts, a coupling network which produces short pulses of peaked waves at each change of direction of the square wave output, an amplifier connected to receive the output of said coupling network, an electron tube having a control grid biased to cut off connected to the output of said amplifier, a connection between said electron tube and the vertical deflecting plates of said first cathode ray tube whereby there is provided in said first cathode ray tube a visual indication of the position along the sweep which said second cathode ray tube is displaying, a first damped tuned circuit connected to the output of said electron tube, a connection between the first damped tuned circuit and the grid of said second cathode ray tube to cause brilliance on the positive half cycle and blackout on the negative half cycle, a second tuned circuit connected to the output of said electron tube and damped to pass only one half cycle of each pulse, and a connection between said second tuned circuit and said second cathode ray tube whereby the sweep of said second cathode ray tube represents one magnified portion of the sweep of said first cathode ray tube.

MAURICE E. BYRNE.

REFERENCES CITED

The following references are of record in the file of this patent:

UNITED STATES PATENTS

| Number | Name | Date |
| --- | --- | --- |
| 2,063,025 | Blumlein | Dec. 8, 1936 |
| 2,085,402 | Vance | June 29, 1937 |
| 2,088,495 | Swedlund | July 27, 1937 |
| 2,139,432 | Andrieu | Dec. 6, 1938 |
| 2,186,388 | Moritz, Jr. | Jan. 9, 1940 |
| 2,193,868 | Geiger | Mar. 19, 1940 |
| 2,215,197 | Sherman | Sept. 17, 1940 |
| 2,241,256 | Gould | May 6, 1941 |
| 2,244,513 | Burton | June 3, 1941 |
| 2,275,460 | Page | Mar. 10, 1942 |
| 2,355,363 | Christaldi | Aug. 8, 1944 |